United States Patent [19]

Iyama

[11] Patent Number: 5,745,805
[45] Date of Patent: Apr. 28, 1998

[54] FOCUS DETECTING DEVICE

[75] Inventor: Noriyuki Iyama, Hachioji, Japan

[73] Assignee: Olympus Optical Co., Ltd., Tokyo, Japan

[21] Appl. No.: 239,535

[22] Filed: May 9, 1994

[30] Foreign Application Priority Data

May 14, 1993 [JP] Japan ..................... 5-113197

[51] Int. Cl.⁶ .......................... G03B 3/00; G03B 13/36
[52] U.S. Cl. ........................... 396/97; 396/114
[58] Field of Search ....................... 354/400, 401,
354/403, 404, 405, 406, 407, 408, 483;
359/512, 741, 820; 396/97, 114, 125

[56] References Cited

U.S. PATENT DOCUMENTS

| | | | |
|---|---|---|---|
| 4,650,309 | 3/1987 | Ishida et al. . | |
| 4,662,735 | 5/1987 | Karasaki et al. | 354/406 |
| 4,772,912 | 9/1988 | Ishida et al. . | |
| 4,828,383 | 5/1989 | Kunishige et al. | 354/404 |
| 4,841,326 | 6/1989 | Koyama et al. . | |
| 4,931,521 | 6/1990 | Matsuda | 526/286 |
| 4,959,677 | 9/1990 | Suda et al. | 354/402 |
| 4,975,727 | 12/1990 | Ohtaka et al. . | |
| 5,233,382 | 8/1993 | Taniguchi et al. | 354/408 |
| 5,251,069 | 10/1993 | Iizuka | 359/717 |
| 5,399,850 | 3/1995 | Nagatani | 250/208.1 |

FOREIGN PATENT DOCUMENTS

| | | |
|---|---|---|
| 60-235110 | 11/1985 | Japan . |
| 63-98614 | 4/1988 | Japan . |
| 1224714 | 9/1989 | Japan . |
| 2817 | 1/1990 | Japan . |
| 5107062 | 4/1993 | Japan . |

Primary Examiner—Russell E. Adams
Attorney, Agent, or Firm—Cushman Darby & Cushman IP Group of Pillsbury Madison & Sutro LLP

[57] ABSTRACT

A focus detecting device includes a photographic lens, a condenser lens disposed adjacent to a preset imaging plane of the photographic lens, an aperture stop having a pair of apertures arranged with sufficient space for ensuring focus accuracy, a reimaging lens having a pair of lens elements arranged to correspond to individual apertures, and a photoelectric converter. Two light beams passing through different areas of the photographic lens are received by the photoelectric converter and the phase difference between the two light beams is detected from the intensity distribution of light on the light-receiving surface of the photoelectric converter so that a focusing state of the photographic lens can be recognized. Further, the focus detecting device satisfies the condition:

$$0.67 \leq h_2/\delta \leq 0.87$$

where $h_2$ is the distance from the optical axis of the condenser lens to the centroidal position of an aperture of the aperture stop and $\delta$ is the distance from the optical axis of the condenser lens to the optical axis of the reimaging lens.

32 Claims, 4 Drawing Sheets

FOCUS DETECTING DEVICE

BACKGROUND OF THE INVENTION

1. Field of the Invention

This invention relates to a focus detecting device for cameras.

2. Description of the Related Art

The optical system of a conventional focus detecting device, as shown in FIG. 1, comprises a photographic lens 1, a condenser lens 3 situated adjacent to a preset imaging plane 2 of the photographic lens 1, an aperture stop 4 having a pair of apertures arranged with sufficient space for ensuring focus accuracy, a reimaging lens 5 having a pair of lens elements arranged to correspond to individual apertures, and a photoelectric converting means composed of a photoelectric converting element array 6. Two light beams passing through different areas of the photographic lens 1 are received by the photoelectric converting element array 6. Consequently, the phase difference between the two light beams is detected from the intensity distribution of light on the light-receiving surface of the photoelectric converting element array 6 so that a focusing state of the photographic lens 1 to an object can be recognized.

FIG. 2 shows the section of a single-lens reflex camera, in the bottom of which is disposed the optical system shown in FIG. 1. In FIG. 2, a light beam passing through the photographic lens 1 is incident on an instant-return mirror 7, by which its optical path is divided into two, one introduced into a finder optical system composed of a focusing screen 8, a prism 9, and an eyepiece 10, and the other introduced through a sub-mirror 11 into the condenser lens 3. This focus detecting optical system is such that the light beam from the exit pupil of the photographic lens 1 fully enters the entrance pupil of the focus detecting optical system to perform accurate focus detection.

In FIG. 1, the position of the entrance pupil is represented by EP, the distance from the preset imaging plane 2 of the photographic lens 1 to the condenser lens 3 by $d_0$, the distance from the condenser lens 3 to the reimaging lens 5 by $d_1$, the distance from the reimaging lens 5 to the photoelectric converting element array 6 by $d_2$, and the distance from a principal axis (the optical axis of the condenser lens 3) 0 to the optical axis of the reimaging lens 5 by $\delta$. For simplicity, as shown in FIG. 3 depicting a paraxial arrangement, it is assumed that the position of the entrance pupil is denoted by EX, the condenser lens 3 is situated in the preset imaging plane 2 of the photographic lens 1 ($d_0$=0), and the distance between the condenser lens 3 and the aperture stop 4 is identical with that between the condenser lens 3 and the reimaging lens 5.

Calling $u_0$ the angle made by a light ray $L_c$ traversing a focus detecting center at the preset imaging plane 2 and the centroid of an aperture of the aperture stop 4 with the principal axis 0 at the preset imaging plane 2, ray heights and emergent angles where the ray $L_c$ passing through individual optical elements, a refracting power $\phi_c$ of the condenser lens 3, and a refracting power $\phi_s$ of the reimaging lens 5 are expressed by $$\phi_c = 1/d_1 - 1/(-d_0 + EX) \tag{1}$$

$$h_1 = -d_0 \times u_0 \tag{2}$$

$$u_1 = \phi_c \times h_1 + u_0 \tag{3}$$

$$h_2 = h_1 - d_1 \times u_1 \tag{4}$$

$$d_2 = h_2/(u_2/\beta) \tag{5}$$

$$\phi_s = (u_0/\beta - u_1)/h_2 \tag{6}$$

$$u_2 = \phi_s (h_2 - \delta) + u_1 \tag{7}$$

$$h_3 = h_2 - d_2 u_1 - d_2 \phi_s (h_2 - \delta) \tag{8}$$

where EX is the position of the entrance pupil of the focus detecting optical system, $\beta$ is the magnification of the focus detecting optical system, $h_1$ is the ray height at the condenser lens, $u_1$ is the angle of emergence from the condenser lens, $h_2$ is the ray height at the reimaging lens (=the distance from the principal axis to the centroid of the aperture of the aperture stop), $d_2$ is the distance from the reimaging lens to the photoelectric converting element array, $u_2$ is the angle of emergence at the reimaging lens, and $h_3$ is the ray height at the photoelectric converting element array.

Here, to simplify the calculation, the photoelectric converting element array 6 is approximately situated at a reimaging position caused by the reimaging lens 5 to set the distance from the reimaging lens 5 to the photoelectric converting element array 6. Although in general the photoelectric converting element array 6 may be disposed away from the reimaging position by the reimaging lens 5, the same holds for this case.

In the focus detecting optical system constructed as mentioned above, however, it is very difficult to make the condenser lens 3 and the reimaging lens 5 of glass because of their formability and workability. It is customary to use plastic as a material. In particular, there is a high possibility that the reimaging lens 5 is integrally configured for reasons of a space between the pair of lens elements and its mounting. However, plastic, unlike glass, undergoes great changes of refractive index and shape as the ambient temperature changes. (This will also be referred to as "ambience.") This considerably changes the distance $\delta$ from the principal axis 0 to the optical axis of the reimaging lens 5, as well as the refracting powers of the condenser lens 3 and the reimaging lens 5. Thus, when a change in ambience takes place, the intensity distribution of the light beams received by the photoelectric converting element array 6 will be varied, with the result that it becomes impossible to perform focus detection with good accuracy. For example, assuming that in accordance with a change in ambience, the refracting power of the reimaging lens 5 changes from $\phi_s$ to $\phi_s'$ and the distance between the principal axis 0 and the optical axis of the reimaging lens 5 also changes from $\delta$ to $\delta'$, a ray height $h_3'$ where a ray $L_c'$ traversing the focus detecting center at the preset imaging plane 2 and the centroid of the aperture of the aperture stop 4 falls on the photoelectric converting element array 6 is given by $$h_3' = h_2 - d_2 u_1 - d_2 \phi_s' (h_2 - \delta') \tag{9}$$

The difference with the ray height $h_3$ shown in Eq. (8) is responsible for the degradation of focus detecting accuracy.

As a means of preventing the degradation of focus detecting accuracy due to the change of ambience by temperature, there is the following example from the prior art. This method is that a temperature detecting means is provided in the camera body as a means for thermal change, and the intensity distribution of the light-receiving surface obtained from a photoelectric converting means in accordance with an output from the temperature detecting means is corrected and calculated to thereby prevent the degradation of focus detecting accuracy. In this case, however, there is the possibility of producing errors of the correction and calculation because of the difference between the ambient temperature of the focus detecting optical system and the temperature obtained from the temperature detecting means, variation in the ambient temperature of the focus detecting optical system, and a time lag attributable to the changes of refracting power and shape of the optical system, etc.

SUMMARY OF THE INVENTION

It is, therefore, an object of the present invention to provide a focus detecting device with a high degree of accuracy which is not affected by the change of ambient temperature.

In order to achieve the above object, the focus detecting device according to the present invention is equipped with a photographic lens, a condenser lens located adjacent to a preset imaging plane of the photographic lens, an aperture stop having a pair of apertures arranged with sufficient space for ensuring focus accuracy, a reimaging lens having a pair of lens elements arranged to correspond to individual apertures, and a photoelectric converting means. Two light beams passing through different areas of the photographic lens are received by the photoelectric converting means. Consequently, the phase difference between the two light beams is detected from the intensity distribution of light on the light-receiving surface of the photoelectric converting means so that a focusing state of the photographic lens can be recognized. Further, the focus detecting device satisfies the condition:

$$0.67 \leq h_2/\delta \leq 0.87 \tag{10}$$

For the construction of the present invention, it is desirable that at least the reimaging lens, of the condenser lens and the reimaging lens, is constructed of such a material that a linear hygroscopic expansion coefficient a relative to a change per unit percentage of humidity of the lens satisfies the condition:

$$-5.00 \times 10^{-6}/\% \leq \alpha \leq 5.00 \times 10^{-6}/\% \tag{11}$$

Based on the construction of the present invention, the function of minimizing the influence of thermal change will be described below. Even though thermal change takes place, the reduction of accuracy by the thermal change will not be brought about, provided the height of a ray striking the photoelectric converting means 6 is consistently maintained, irrespective of the rays $L_c$ and $L_c'$. This is explained, using equations:

$$h_3 = h_3' \tag{12}$$

and therefore, $$h_2 - d_2 u_1 - d_2 \phi_s (h_2 - \delta) = h_2 - d_2 u_1 - d_2 \phi_s' (h_2 - \delta') \tag{12'}$$

Since in this equation the ray height $h_2$, the distance $d_2$, and the emergent angle $u_1$ are practically constant even though the temperature varies, it follows that $$\phi_s (h_2 - \delta) = \phi_s' (h_2 - \delta') \tag{13}$$

Subsequently, reference is made to the change of refracting power of a lens where the refractive index and shape of a medium varies with the temperature. In general, when the refractive index of a medium is denoted by n, the radius of curvature of the first surface of a lens by $r_1$, and the radius of curvature of the second surface by $r_2$, a refracting power $\phi$ of the lens with a thickness d is defined as $$\phi = (n-1)(1/r_1 - 1/r_2) + (n-1)^2 d/(n r_1 r_2) \tag{14}$$

Here, since the radii of curvature $r_1$ and $r_2$ are much larger than the thickness d, the right-hand second term of Eq. (14) is negligible. A refracting power $\phi'$ of the lens where the refractive index changes with the temperature can therefore be expressed by $$\phi' = (n'-1)/(n-1) \times \phi \tag{15}$$

where $\phi$ is the refracting power at an ordinary temperature (+20° C.), n is the refractive index of a medium at an ordinary temperature, and n' is the refractive index of the medium after thermal change.

Further, the refracting power $\phi'$ of the lens whose shape changes with the temperature is expressed by $$\phi' = \phi \times \{100/(100 + \Delta k)\} \tag{16}$$

where $\Delta k$ is the rate of shape change (%) [the value of $\Delta k$ when a length L at an ordinary temperature changes to $L\{(100+\Delta k)/100\}$ after thermal change].

Hence, considering the changes of both the refractive index and the shape, the refracting power $\phi'$ of the lens is given by $$\phi' = (n'-1)/(n-1) \times \{100/(100 + \Delta k)\} \times \phi \tag{17}$$

Further, considering the shape change, the distance $\delta'$ from the principal axis 0 to the optical axis of the reimaging lens 5 is given by $$\delta' = \delta \times \{(100 + \Delta k)/100\} \tag{18}$$

As mentioned above, when the condenser lens 3 is situated in the preset imaging plane 2 of the photographic lens 1, the refractive index and shape of the condenser lens 3 varying with the temperature have no influence on the ray height $h_3$ at which the ray $L_c$ falls on the photoelectric converting element array 6. Thus, it is only necessary to consider the changes of the refractive index and shape of the reimaging lens 5. Additionally, if the reimaging lens 5 is constructed with a plano-convex lens having a planar surface on the reimaging plane side, there will be a great advantage in design. The reason is that this minimizes the influence of changes in ambient temperature on the radius of curvature of the reimaging plane of the reimaging lens 5 and that exerted by the shift of the position of the principal point.

Further, Eq. (13) is rewritten as $$\phi_s/\phi_s' = (h_2 - \delta')/(h_2 - \delta) \tag{13'}$$

Here, consider the case where Eq. (13') is established. The refracting power $\phi_s'$ of the reimaging lens 5 after thermal change is defined as $$\phi_s' = \{(n'-1)/(n-1)\} \times \{100/(100 + \Delta k)\} \times \phi_s \tag{17'}$$

If $A = \{(n'-1)/(n-1)\} \times \{100/(100 + \Delta k)\}$, the refracting power $\phi_s'$ becomes $$\phi_s' = A \phi_s \tag{19}$$

Further, the distance $\delta'$ from the principal axis 0 to the optical axis of the reimaging lens 5, after thermal change, is expressed as $$\begin{aligned}\delta' &= \delta \times \{(100 + \Delta k)/100\} \\ &= \delta(1 + \Delta k/100) \\ &= \delta + \delta(\Delta k/100)\end{aligned} \tag{20}$$

Hence, Eq. (13') becomes (the left-hand member) $= \phi_r/(A\phi_s) = 1/A$ (the right-hand member) $= (h_2 - \delta')/(h_2 - \delta)$ $= [h_2 - \{\delta + \delta(\Delta k/100)\}]/(h_2 - \delta)$ $= 1 - \delta\{(\Delta k/100)/(h_2 - \delta)\}$ and therefore, $1/A = 1 - \delta\{(\Delta k/100)/(h_2 - \delta)\}$ Further, $\delta(\Delta k/100)/(h_2 - \delta) = 1 - (1/A) = (A-1)/A$ $h_2 - \delta = \{A/(A-1)\}\{\delta(\Delta k/100)\}$ $h_2 = \delta[1 + \{A/(A-1)\}(\Delta k/100)]$ and therefore, $$\delta = h_2/[1 + \Delta k\, A/\{100(A-1)\}] \quad (21)$$

That is, if the distance δ and the ray height $h_2$ are set so as to satisfy Eq. (21), focus detection can be made with high accuracy, even though thermal change has been brought about. Here, Tables 1–3 give the values of 1+Δk A/{100(A−1)} (=X) at various temperatures (°C.) relative to polyolefin resin (for example, ZEONEX by Nippon Zeon Co., Ltd.), PC (polycarbonate resin), and PMMA (acrylic resin), respectively, which are polymer compounds (organic substances). These characteristics also hold for lenses in which glass is coated with the organic substances and then configured.

system which is highly accurate irrespective of change in ambient temperature can be constructed also by adjusting the distance δ from the principal axis to the optical axis of the reimaging lens 5 to satisfy Eq. (10), so that the influence of the refracting power $\phi_r'$ of the reimaging lens 5 on the ray height $h_3'$ is offset by that of the distance δ on the ray height $h_3'$. Preferably, the ray height $h_2$ and the distance δ are set so that $h_3 \approx h_3'$.

Even if the value of $h_2/\delta$ somewhat differs from that obtained from the calculation, as mentioned above, it is possible to achieve highly accurate focus detection insusceptible to change in ambient temperature and humidity by preliminarily providing a temperature detecting means inside the camera body, holding in the camera body a value to be used for correction in accordance with the difference between the ray height $h_3$ of the ray $L_c$ at an ordinary temperature and the ray height $h_3'$ of the ray $L_c$ after temperature change, and correcting the intensity distribution obtained from the photoelectric converting member array 6 in accordance with the temperature detected by the temperature detecting means, by using this value for correction. In this case, the requirement of Eq. (19) allows the value for correction to be small, and the influences can be minimized which are exerted by a time lag attributable to the changes of refractive indices and shapes of the condenser lens 3 and the reimaging lens 5 by temperature, the change of temperature distribution inside the camera, etc.

Preferably, the optical system is constructed so as to avoid too large a value of the distance δ over the height $h_2$ for the incidence of the light beam on the reimaging lens 5. For the factor of the change of ambience exerting the influence on the focus detecting system, it is desirable to take account of a humidity change in addition to the temperature change.

Hence, if the focus detecting optical system which has good accuracy with respect to the temperature change is

TABLE 1

| Temp. | −10.00000 | 0.00000 | 10.00000 | 30.00000 | 40.00000 | 50.00000 |
|---|---|---|---|---|---|---|
| X | 0.771 | 0.769 | 0.768 | 0.766 | 0.765 | 0.764 |

TABLE 2

| Temp. | −10.00000 | 0.00000 | 10.00000 | 30.00000 | 40.00000 | 50.00000 |
|---|---|---|---|---|---|---|
| X | 0.771 | 0.773 | 0.774 | 0.778 | 0.780 | 0.782 |

TABLE 3

| Temp. | −10.00000 | 0.00000 | 10.00000 | 30.00000 | 40.00000 | 50.00000 |
|---|---|---|---|---|---|---|
| X | 0.754 | 0.763 | 0.772 | 0.788 | 0.795 | 0.801 |

As shown in Tables 1–3, the values of X at various temperatures are almost constant. Specifically, for the distance $h_2$ from the principal axis to the centroidal position of the aperture of the aperture stop, the distance δ from the principal axis 0 to the optical axis of the reimaging lens 5 can be determined with a single value so that the accuracy of focus detection does not degrade even when temperature change takes place. In this case, even though the value of $h_2/\delta$ somewhat differs from the result of the calculation, there is no problem of destroying the accuracy. Then, it is desirable that the value of $h_2/\delta$ satisfies Eq. (10).

Even when the condenser lens 3 is disposed at a position shifted from the preset imaging plane 2, a focus detecting designed in the above-mentioned way, focus detection can be made more desirably with a considerable degree of accuracy, without undergoing the influence of the change of ambience by temperature and humidity.

This and other objects as well as the features and advantages of the present invention will becomes apparent from the following detailed description of the preferred embodiments when taken in conjunction with the accompanying drawings.

DETAILED DESCRIPTION OF THE PREFERRED EMBODIMENTS

In accordance with the drawings, the embodiments of the focus detecting device according to the present invention will be explained in detail below.

Figure 1:
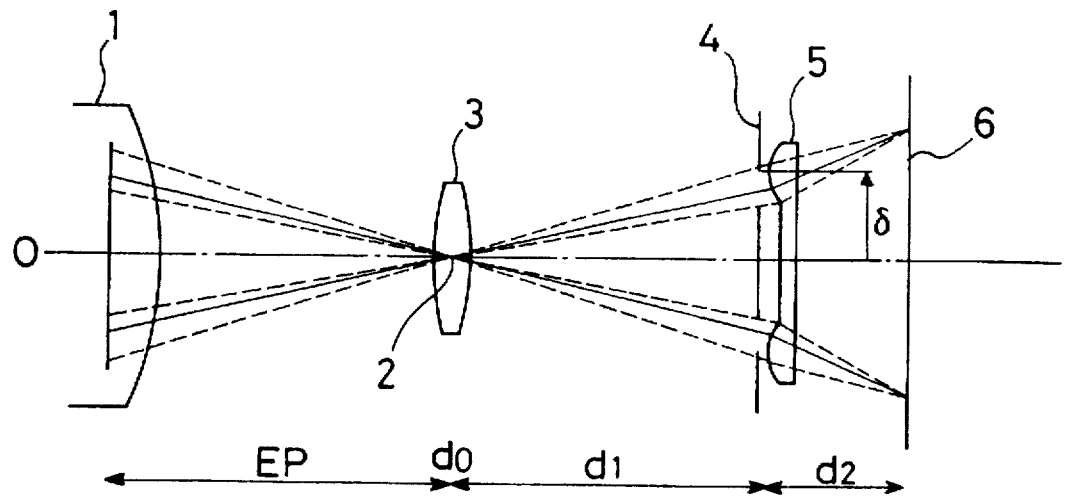
FIG. 1 is a view showing the arrangement of an optical system in a focus detecting device of prior art.
Figure 2:
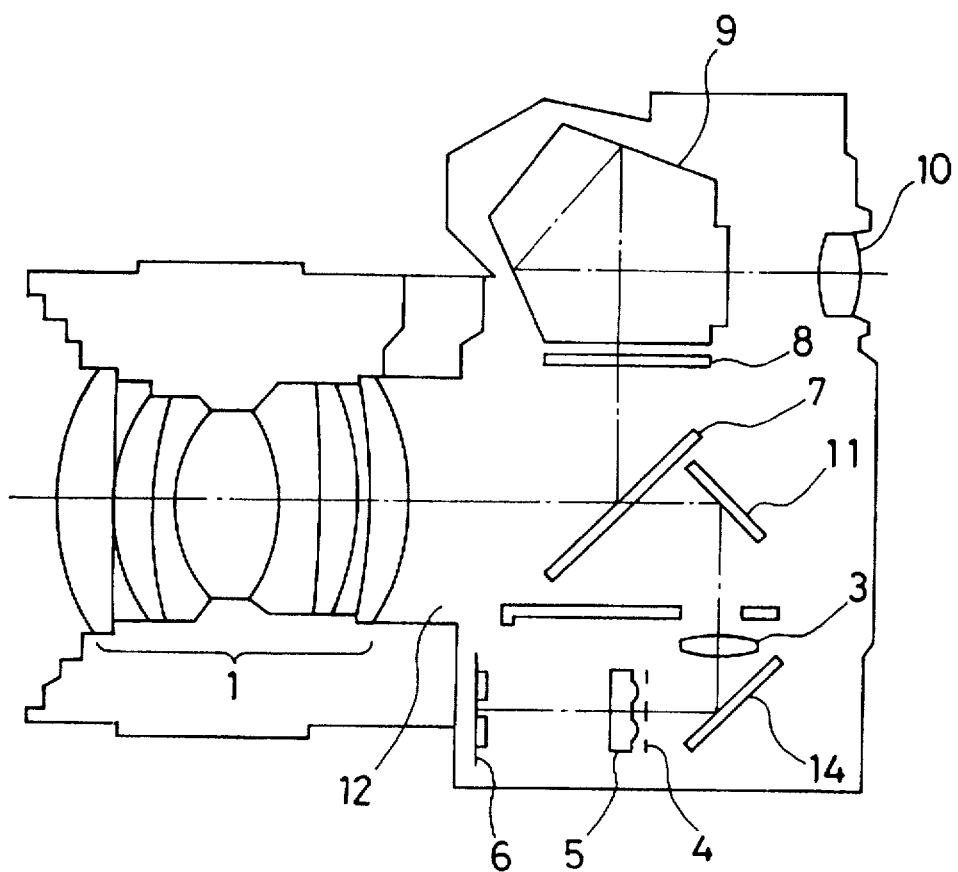
FIG. 2 is a sectional view of a single-lens reflex camera, in the bottom of which is disposed the optical system shown in FIG. 1.
Figure 3:
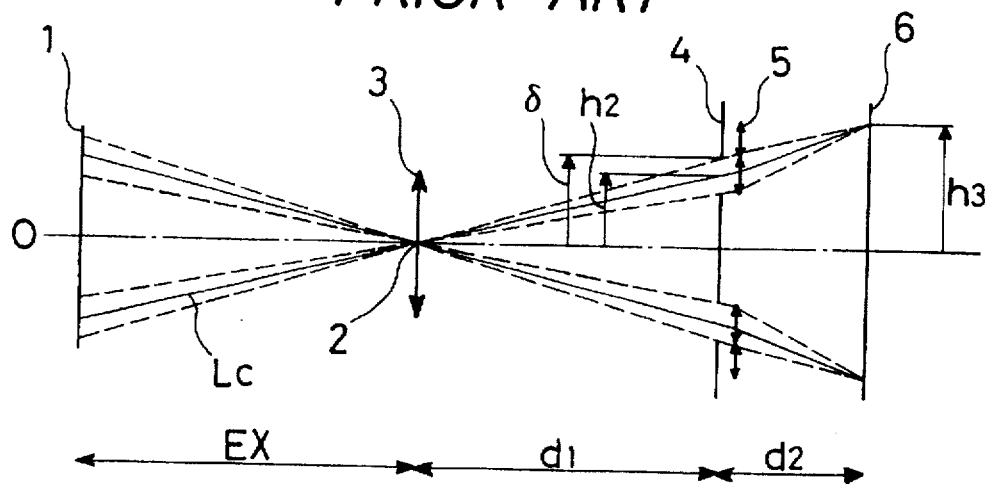
FIG. 3 is a view showing a paraxial arrangement of the optical system shown in FIG. 1.
Figure 4:
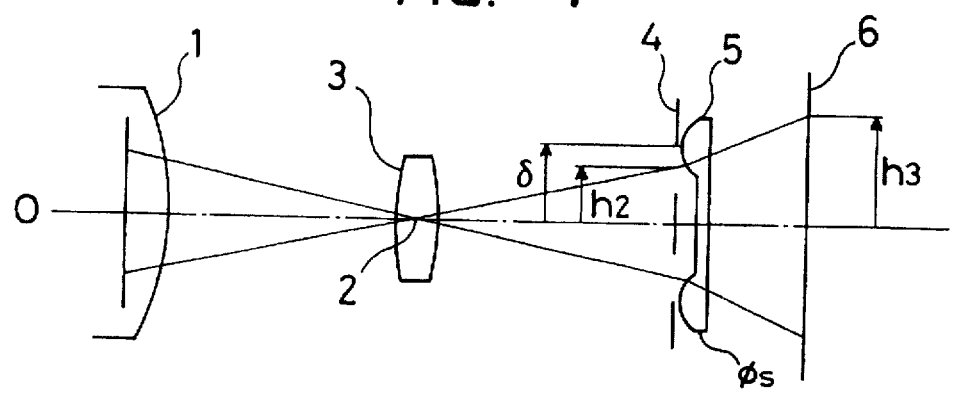
FIG. 4 is a view showing the arrangement of an optical system in a first embodiment of a focus detecting device according to the present invention.
Figure 5:
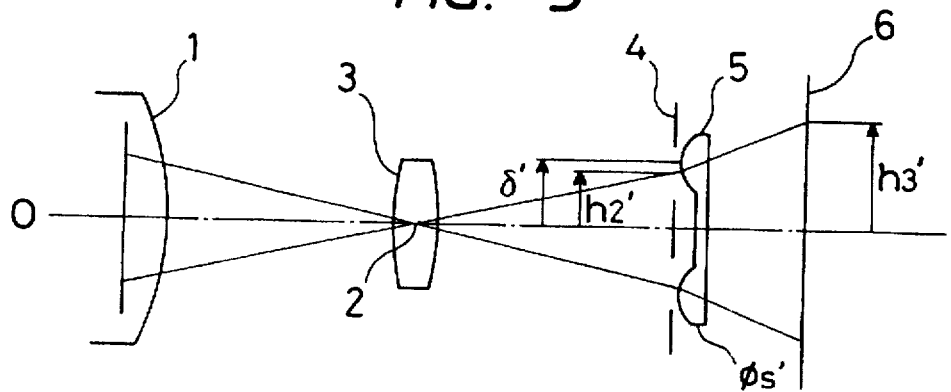
FIG. 5 is a view showing a state where a distance from a principal axis to the optical axis of a reimaging lens is changed in the optical system of the first embodiment.

FIGS. 4 and 5 show an optical system of the first embodiment according to the present invention. As depicted in FIG. 4, the optical system of this embodiment comprises a photographic lens 1, a condenser lens 3 situated adjacent to a preset imaging plane 2 of the photographic lens 1, an aperture stop 4 having a pair of apertures arranged with sufficient space for ensuring focus accuracy, a reimaging lens 5 having a pair of lens elements arranged to correspond to individual apertures, and a photoelectric converting means composed of a photoelectric converting element array 6. Two light beams passing through different areas of the photographic lens 1 are received by the photoelectric converting element array 6. Consequently, the phase difference between the two light beams is detected from the intensity distribution of light on the light-receiving surface of the photoelectric converting element array 6 so that a focusing state of the photographic lens 1 to an object can be recognized.

Also, the space between a pair of apertures of the aperture stop 4 (which is $2h_2$ in FIG. 4) is adapted to ensure focus accuracy. An excessively larger space needs a wide beam compared with the exit pupil of the photographic lens and makes it impossible to make a distance measurement if the F number of the photographic lens is great. A smaller space, on the other hand, causes the degradation of focus accuracy.

Subsequently, reference is made to the function of the first embodiment. For simplicity, it is assumed that the condenser lens 3 is located in the preset imaging plane 2 of the photographic lens 1 and the distance from the condenser lens 3 to the aperture stop 4 is identical with that from the condenser lens 3 to the reimaging lens 5. The condenser lens 3 and the reimaging lens 5 are constructed of a material (polyolefin resin) which undergoes little change in refractive index and shape by humidity. The ray heights and emergent angles where the ray $L_c$ passing through individual optical elements, the refracting power $\phi_c$ of the condenser lens 3, and the refracting power $\phi_s$ of the reimaging lens 5 are determined by Eqs. (1)–(8).

Figure 6:
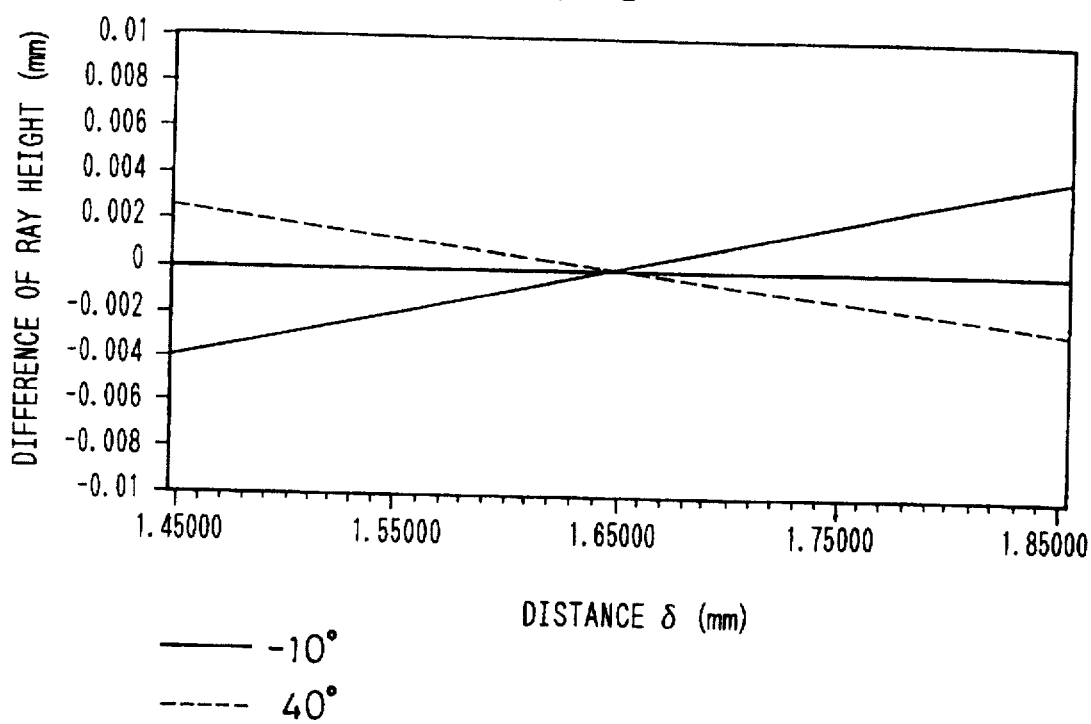
FIG. 6 is a diagram showing the influence of the temperature on the ray height in the first embodiment.
Figure 7:
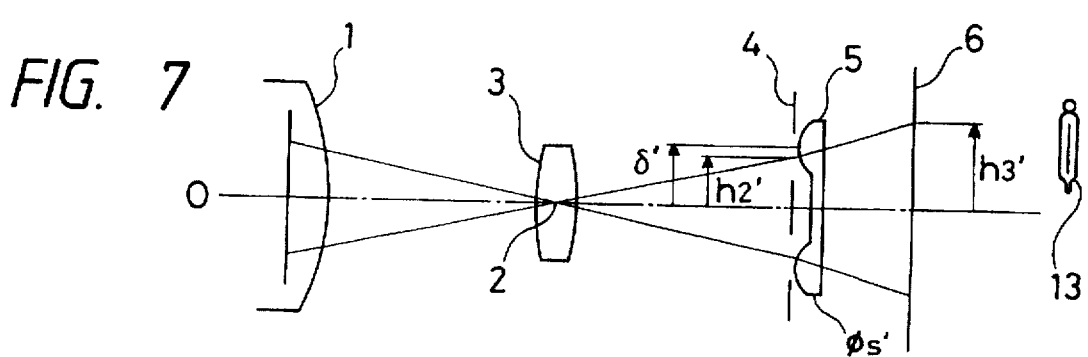
FIG. 7 is a view for explaining a case where a temperature detecting means and correction control means are used with the optical system in the state of FIG. 5.

The distance from the preset imaging plane 2 of the photographic lens 1 to the condenser lens 3 is set to 0 and the distance from the condenser lens 3 to the reimaging lens 5 is set to 15 mm. Then, the distance δ from the principal axis 0 to the optical axis of the reimaging lens 5 is changed (FIG. 5). In this state, FIG. 6 shows the difference between the ray height $h_3$ of the ray $L_c$ striking the photoelectric converting element array 6 at an ordinary temperature (20° C.) and the ray height $h_3'$ of the ray $L_c'$ where temperature changes (−10° C., 40° C.) take place. As shown in FIG. 6, when the distance δ=1.64, the difference in ray height between the rays $L_c$ and $L_c'$ falling on the photoelectric converting element array 6 which is caused by the temperature change is nearly zero at either −10° or 40°. In other words, even when the change of ambience is brought about, focus detection is performed with a high degree of accuracy. In this case, Eq. (10) is established.

Where the value of the distance δ is set separate from δ=1.64, correction of the intensity distribution, may be made in accordance with the temperature measured by a temperature detecting means 13 held in the camera body (see FIG. 7). In this case, the optical system fulfils the requirements given in Table 4.

TABLE 4

| | |
|---|---|
| Position of entrance pupil of focus detecting system (EX) | 200 |
| Distance from preset imaging plane 2 to condenser lens 3 (d0) | 0 |
| Magnification of focus detecting optical system (β) | −0.5 |
| Angle made by ray Lc with principal axis 0 at primary imaging plane 2 (u0) | −0.08333 |
| Distance from aperture stop 4 to reimaging lens 5 (d3) | 0 |
| Ray height where ray Lc traverses reimaging lens 5 (h2) | 1.25 |
| h2/δ | 0.762 |

Figure 8:
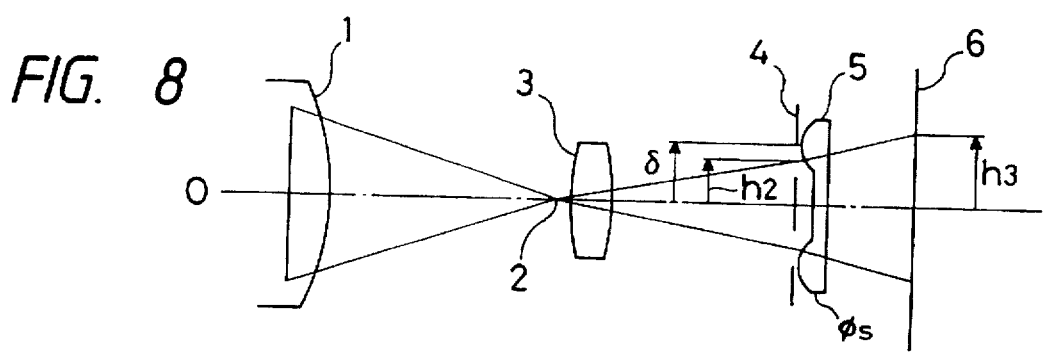
FIG. 8 is a view showing the arrangement of an optical system in a second embodiment of the present invention.
Figure 9:
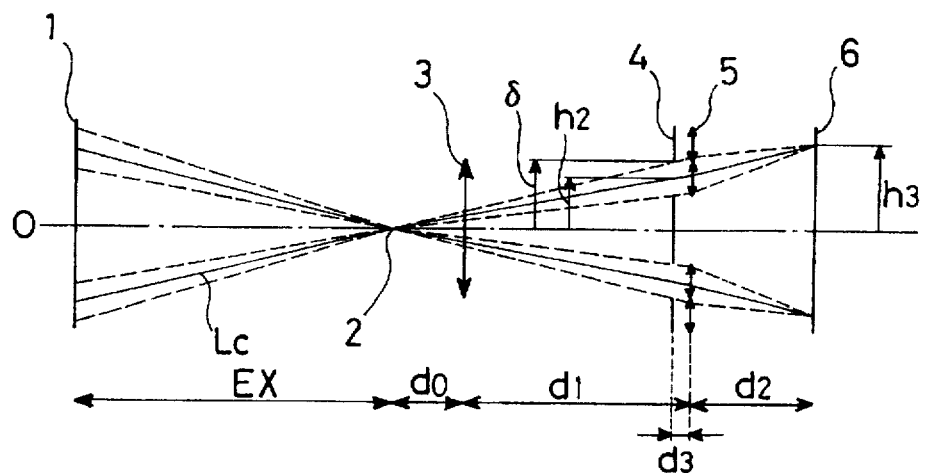
FIG. 9 is a view showing a paraxial arrangement of the optical system shown in FIG. 8.

FIGS. 8 and 9 show the second embodiment of the focus detecting device according to the present invention. In this embodiment, the condenser lens 3 is disposed separate from the preset imaging plane 2 of the photographic lens 1. In this way, by shifting the position of the condenser lens 3 toward the reimaging lens 5, a mirror box can be made larger.

Since the second embodiment is constructed as mentioned above, the ray heights and emergent angles where the ray $L_c$ passing through individual optical elements, the refracting power $\phi_c$ of the condenser lens 3, the refracting power $\phi_s$ of the reimaging lens 5, and the distance δ from the principal axis 0 to the optical axis of the reimaging lens 5 are given by Eqs. (1)–(8). However, the angle $u_o'$ made by the ray $L_c'$ with the principal axis 0 at the preset imaging plane 2 after the change of ambience is given by $$u_0' = h_2/(d_0 \times d_1 \times \phi_c' - d_0 - d_1) \tag{22}$$

Preferably, the ray height $h_2$ and the distance δ are set so that $h_3 \approx h_3'$. These can be found as the optimum values from Eqs. (1)–(8) and (22).

Figure 10:
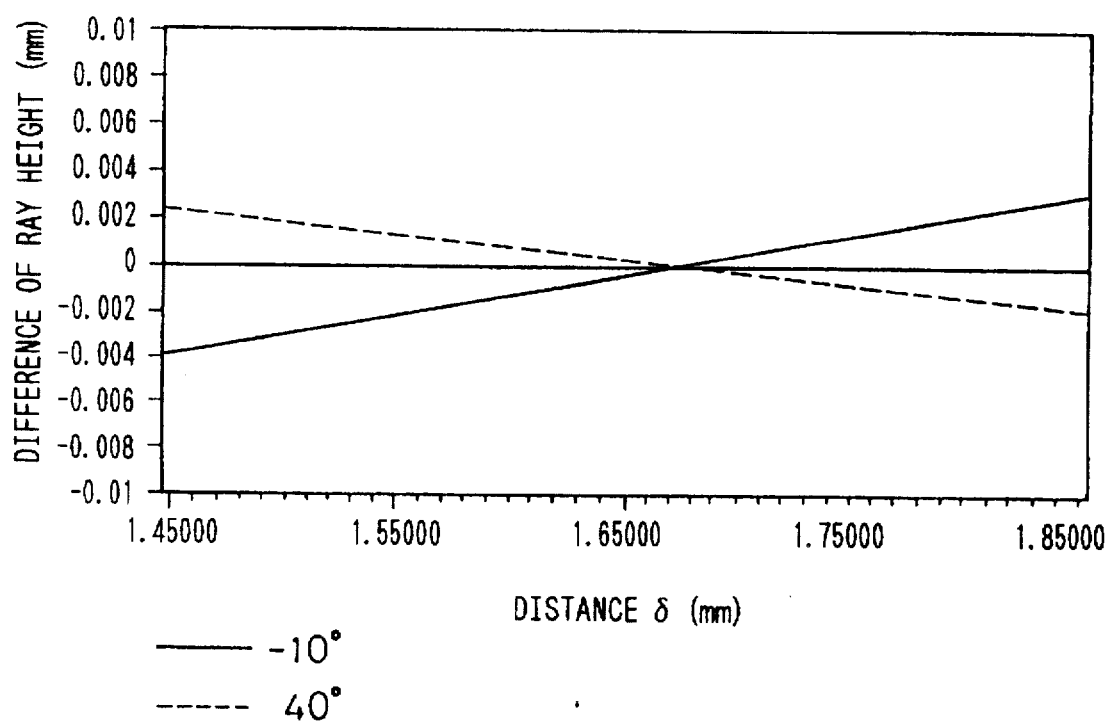
FIG. 10 is a diagram showing the influence of the temperature on the ray height in the second embodiment.

The distance from the condenser lens 3 to the reimaging lens 5 is set to 15 mm, and then the distance δ from the principal axis 0 to the optical axis of the reimaging lens 5 is changed. In this state, FIG. 10 shows the difference between the ray height $h_3$ of the ray $L_c$ striking the photoelectric converting element array 6 at an ordinary temperature (20° C.) and the ray height $h_3'$ of the ray $L_c'$ where temperature changes (−10° C., 40° C.) take place. As shown in FIG. 10, when the distance δ=1.67, the difference in ray height between the rays $L_c$ and $L_c'$ falling on the photoelectric converting element array 6 which is caused by the temperature change is nearly zero at either −10° or 40°. In other words, even when the change of ambience is brought about, focus detection is performed with a high degree of accuracy. In this case, Eq. (10) is established.

Where the value of the distance δ is set separate from δ=1.67, correction of the intensity distribution, may be made in accordance with the temperature measured by a temperature detecting means 13 held in the camera body. In this case, the optical system fulfils the requirements given in Table 5.

TABLE 5

| | |
|---|---|
| Position of entrance pupil of focus detecting system (EX) | 200 |
| Distance from preset imaging plane 2 to condenser lens 3 (d0) | 5.13 |
| Magnification of focus detecting optical system (β) | −0.5 |
| Angle made by ray Lc with principal axis 0 at primary imaging plane 2 (u0) | −0.08333 |
| Distance from aperture stop 4 to reimaging lens 5 (d3) | 0.1 |
| Ray height where ray Lc traverses reimaging lens 5 (h2) | 1.209 |
| h2/δ | 0.764 |

What is claimed is:

1. A focus detecting device for cameras, comprising:
   a photographic lens;
   a condenser lens disposed adjacent to a preset imaging plane of said photographic lens;
   an aperture stop having a pair of aperture arranged with sufficient space for ensuring focus accuracy;
   a reimaging lens having a pair of lens elements arranged to correspond to individual apertures;
   a photoelectric converting means,
      having two light beams which pass through different areas of said photographic lens being received by said photoelectric converting means, a phase difference between the two light beams being detected from intensity distribution of light on a light-receiving surface of said photoelectric converting means so that a focusing state of said photographic lens can be recognized; and
      wherein said focus detecting device satisfies the following condition:

$$0.67 \leq h_2/\delta \leq 0.87$$

where $h_2$ is a distance from an optical axis of said condenser lens to a centroidal position of an aperture of said aperture stop and $\delta$ is a distance from the optical axis of said condenser lens to an optical axis of said reimaging lens.

2. The focus detecting device according to claim 1, wherein said reimaging lens is constructed of polymer compounds and satisfies the following condition:

$$-5.00 \times 10^{-6}/\% \leq \alpha \leq 5.00 \times 10^{-6}/\%$$

where α is a linear hygroscopic expansion coefficient relative to a change per unit percentage of humidity of the lens.

3. The focus detecting device according to claim 1, wherein said condenser lens and said reimaging lens are constructed of polymer compounds and satisfies the following condition:

$$-5.00 \times 10^{-6}/\% \leq \alpha \leq 5.00 \times 10^{-6}/\%$$

where α is a linear hygroscopic expansion coefficient relative to a change per unit percentage of humidity of the lens.

4. The focus detecting device according to any one of claims 1, 2 or 3, further comprising temperature detection means provided in a camera body and temperature correcting control means, wherein said temperature detection means detects a temperature in the camera body and said temperature correcting control means corrects the intensity distribution on the light-receiving surface of said photoelectric converting means from the detected temperature to detect a proper focus.

5. The focus detecting device according to claims 2 or 3, wherein polymer compounds constituting said reimaging lens are polyolefin resin.

6. The focus detecting device according to claim 4, wherein polymer compounds constituting said reimaging lens are polyolefin resin.

7. The focus detecting device according to any one of claims 1, 2 or 3, wherein said reimaging lens is a plano-convex lens whose plane surface is directed toward said photoelectric converting means.

8. The focus detecting device according to claim 4, wherein said reimaging lens is a plano-convex lens whose plane surface is directed toward said photoelectric converting means.

9. The focus detecting device according to claim 6, wherein said reimaging lens is a plano-convex lens whose plane surface is directed toward said photoelectric converting means.

10. The focus detecting device according to claim 5, wherein said reimaging lens is a plano-convex lens whose plane surface is directed toward said photoelectric converting means.

11. The focus detecting device according to any one of claims 1, 2 or 3, wherein said reimaging lens is integrally configured.

12. The focus detecting device according to claim 4, wherein said reimaging lens is integrally configured.

13. The focus detecting device according to claim 5, wherein said reimaging lens is integrally configured.

14. The focus detecting device according to claim 6, wherein said reimaging lens is integrally configured.

15. The focus detecting device according to claim 7, wherein said reimaging lens is integrally configured.

16. The focus detecting device according to claim 8, wherein said reimaging lens is integrally configured.

17. The focus detecting device according to claim 9, wherein said reimaging lens is integrally configured.

18. The focus detecting device according to claim 10, wherein said reimaging lens is integrally configured.

19. A focus detecting device for cameras, comprising:
   a photographic lens;
   a condenser lens disposed adjacent to a preset imaging plane of said photographic lens;
   an aperture stop having a pair of apertures arranged with sufficient space for ensuring focus accuracy;
   a reimaging lens having a pair of lens elements arranged to correspond to individual apertures;
   a photoelectric converting means,
      having two light beams which passes through different areas of said photographic lens being received by said photoelectric converting means, a phase difference between the two light beams being detected from intensity distribution of light on a light-receiving surface of said photoelectric converting means so that a focusing state of said photographic lens can be recognized; and
      wherein said reimaging lens is constructed of polymer compounds and satisfies a condition:

$$-5.00 \times 10^{-6}/\% \leq \alpha \leq 5.00 \times 10^{-6}/\%$$

where α is a linear hygroscope expansion coefficient relative to a change per unit percentage of humidity of the lens.

20. The focus detecting device according to claim 19, wherein said condenser lens is constructed of polymer compounds and satisfies the following condition:

$$-5.00\times10^{-6}/\% \leq \alpha \leq 5.00\times10^{-6}/\%$$

where $\alpha$ is a linear hygroscopic expansion coefficient relative to a change per unit percentage of humidity of the lens.

21. The focus detecting device according to claims 19 or 20, satisfying the following condition:

$$0.67 \leq h_2/\delta \leq 0.87$$

where $h_2$ is a distance from an optical axis of said condenser lens to a centroidal position of an aperture of said aperture stop and $\delta$ is a distance from the optical axis of said condenser lens to an optical axis of said reimaging lens.

22. The focus detecting device according to claim 21, further comprising temperature detection means provided in a camera body and temperature correcting control means, wherein said temperature detection means detects a temperature in the camera body and said temperature correcting control means corrects the intensity distribution on the light-receiving surface of said photoelectric converting means from the detected temperature to detect a proper focus.

23. The focus detecting device according to claims 19 or 20, wherein polymer compounds constituting said reimaging lens are polyolefin resin.

24. The focus detecting device according to claim 21, wherein polymer compounds constituting said reimaging lens are polyolefin resin.

25. The focus detecting device according to claim 23, wherein said reimaging lens is a plano-convex lens whose plane surface is directed toward said photoelectric converting means.

26. The focus detecting device according to claim 23, wherein said reimaging lens is integrally configured.

27. The focus detecting device according to claim 25, wherein said reimaging lens is integrally configured.

28. The focus detecting device according to claim 22, wherein said reimaging lens is a plano-convex lens whose plane surface is directed toward said photoelectric converting means.

29. The focus detecting device according to claim 24, wherein said reimaging lens is a plano-convex lens whose plane surface is directed toward said photoelectric converting means.

30. The focus detecting device according to claim 28, wherein said reimaging lens is integrally configured.

31. The focus detecting device according to claim 29, wherein said reimaging lens is integrally configured.

32. A focus detecting device for cameras, comprising:

a photographic lens;

a condenser lens disposed adjacent to a preset imaging plane of said photographic lens;

an aperture stop having a pair of apertures arranged with sufficient space for ensuring focus accuracy;

a reimaging lens having a pair of lens elements arranged to correspond to individual apertures;

a photoelectric converting means, having two light beams which pass through different areas of said photographic lens being received by said photoelectric converting means, a phase difference between the two light beams being detected from intensity distribution of light on a light-receiving surface of said photoelectric converting means so that a focusing state of said photographic lens can be recognized; and wherein said focus detecting device satisfies the following condition $$0.67 \leq h_2/\delta \leq 0.87,$$

where $h_2$, a distance from an optical axis of said condenser lens to a centroidal position of an aperture of said aperture stop, and $\delta$, a distance from the optical axis of said condenser lens to an optical axis of said reimaging lens are selected such that relatively broad variations in temperature does not substantially alter the signal of said focus detecting device.

* * * * *